United States Patent
Yermal et al.

(10) Patent No.: US 7,966,660 B2
(45) Date of Patent: Jun. 21, 2011

(54) APPARATUS AND METHOD FOR DEPLOYING A WIRELESS NETWORK INTRUSION DETECTION SYSTEM TO RESOURCE-CONSTRAINED DEVICES

(75) Inventors: Sudarshan Yermal, Bangalore (IN); Abhishek K. Singh, Bangalore (IN); Kartikeya S. Ramanathan, Chennai (IN)

(73) Assignee: Honeywell International Inc., Morristown, NJ (US)

( * ) Notice: Subject to any disclaimer, the term of this patent is extended or adjusted under 35 U.S.C. 154(b) by 952 days.

(21) Appl. No.: 11/900,623

(22) Filed: Sep. 11, 2007

(65) Prior Publication Data

US 2008/0291017 A1    Nov. 27, 2008

Related U.S. Application Data

(63) Continuation-in-part of application No. 11/752,308, filed on May 23, 2007.

(51) Int. Cl.
    *H04L 29/14*        (2006.01)
(52) U.S. Cl. .............................. 726/22; 726/23; 726/24
(58) Field of Classification Search .................. None
    See application file for complete search history.

(56) References Cited

U.S. PATENT DOCUMENTS

| | | | |
|---|---|---|---|
| 5,915,119 A | 6/1999 | Cone | |
| 6,052,778 A | 4/2000 | Hagy et al. | |
| 6,408,391 B1 | 6/2002 | Huff et al. | |
| 7,143,441 B2 * | 11/2006 | Rygaard | 726/22 |
| 7,246,156 B2 | 7/2007 | Ginter et al. | |
| 2001/0021176 A1 | 9/2001 | Mimura et al. | |
| 2003/0217289 A1 | 11/2003 | Ammon et al. | |
| 2004/0028016 A1 | 2/2004 | Bitthartz | |
| 2004/0037423 A1 * | 2/2004 | Ghanea-Hercock | 380/270 |
| 2004/0107219 A1 | 6/2004 | Rosenberger | |
| 2004/0162995 A1 | 8/2004 | Muaddi et al. | |
| 2006/0053491 A1 | 3/2006 | Khuti et al. | |

(Continued)

FOREIGN PATENT DOCUMENTS

| | | |
|---|---|---|
| WO | WO 03/088532 A1 | 10/2003 |
| WO | WO 03/101023 A2 | 12/2003 |

OTHER PUBLICATIONS

Meik Felser et al., "Dynamic Software Update of Resource-Constrained Distributed Embedded Systems," 13 pages.

(Continued)

*Primary Examiner* — Minh Dinh
*Assistant Examiner* — Venkat Perungavoor
(74) *Attorney, Agent, or Firm* — Munck Carter, LLP

(57) ABSTRACT

Wireless devices, such as field devices or repeater/relay nodes, detect the presence of anomalies in data packets that suggest intrusion. Upon detection of an anomaly, a wireless device sends a notification to a sentinel device, which determines if intrusion may be occurring. If so, the sentinel device downloads a spy routine to at least one of the wireless devices, which enables further investigation into and/or isolation of the intrusion. Since the spy routine is downloaded to the wireless devices, the spy routine can be used in conjunction with memory-constrained wireless devices. Memory-constrained wireless devices may lack adequate memory for storing both a main application executed during normal operation and the spy routine. The spy routine could overwrite one or more modules of the main application. Once executed, the spy routine could itself be overwritten by the one or more modules, allowing the wireless device to return to normal operation.

31 Claims, 7 Drawing Sheets

U.S. PATENT DOCUMENTS

| | | | |
|---|---|---|---|
| 2006/0150250 A1* | 7/2006 | Lee et al. | 726/23 |
| 2006/0272025 A1* | 11/2006 | Mononen | 726/26 |
| 2007/0021140 A1 | 1/2007 | Keyes et al. | |
| 2007/0192862 A1* | 8/2007 | Vermeulen et al. | 726/23 |
| 2007/0199060 A1* | 8/2007 | Touboul | 726/11 |
| 2007/0217371 A1 | 9/2007 | Sinha | |
| 2007/0271614 A1* | 11/2007 | Capalik | 726/23 |
| 2009/0320132 A1 | 12/2009 | Sheymov et al. | |

OTHER PUBLICATIONS

Dunkels, et al, "Run-Time Dynamic Linking for Reprogramming Wireless Sensor Networks," Swedish Institute of Computer Science, 14 pages.

U.S. Appl. No. 11/752,308 entitled "Intrusion Detection System for Wireless Networks," 25 pages and six (6) sheets of drawings as filed.

* cited by examiner

APPARATUS AND METHOD FOR DEPLOYING A WIRELESS NETWORK INTRUSION DETECTION SYSTEM TO RESOURCE-CONSTRAINED DEVICES

CROSS-REFERENCE TO RELATED APPLICATIONS

This application is a continuation-in-part of U.S. patent application Ser. No. 11/752,308 filed on May 23, 2007, which is hereby incorporated by reference.

TECHNICAL FIELD

This disclosure relates generally to security in wireless networks and more specifically to an apparatus and method for deploying a wireless network intrusion detection system to resource-constrained devices.

BACKGROUND

A wireless network generally represents a communication network formed by devices communicating wirelessly over a wireless medium. Some examples of wireless networks include wireless local area networks (WLAN) and cellular communication networks.

Wireless devices forming part of a wireless network generally connect to and operate in the wireless network without requiring fixed or known locations, unlike a wired network where wired devices are generally located at known connection points. Consequently, compared to wired networks, there is generally an enhanced probability for an unauthorized or "rogue" wireless device to connect to a wireless network. In general, an "intruder" represents any system or device transmitting unauthorized (or otherwise undesirable) packets to a wireless network. These "intrusions" in a wireless network are generally undesirable, and an intrusion detection system may be employed in the wireless network to detect and/or prevent these intrusions.

In a prior intrusion detection system, a wireless security component is deployed in a wireless network, and the wireless security component monitors all or most of the communication traffic (data packets) received on the wireless network. For example, the wireless security component may store the packets and then analyze the stored packets to detect any anomalies that suggest possible intrusions.

One problem with this type of approach is that the wireless devices in a wireless network are often memory constrained and/or power constrained. This may be a particular problem in environments such as industrial process control systems. Constrained devices may include wireless field devices (such as wireless sensors) and other wireless devices (such as intermediate nodes). This problem often presents difficulties when the wireless security component must reside on and be executed by the constrained wireless devices.

SUMMARY

This disclosure provides an apparatus and method for deploying a wireless network intrusion detection system to resource-constrained devices.

In a first embodiment, a system includes a plurality of wireless devices configured to receive data packets over a wireless medium. At least one of the wireless devices is configured to detect one or more anomalies associated with a received data packet. The system also includes a sentinel device configured to communicate a spy routine to one or more of the wireless devices in response to the detection of the one or more anomalies. The one or more wireless devices are further configured to execute the spy routine to facilitate a determination of whether a transmitter of the received data packet is an intruder and/or isolation of the transmitter.

In particular embodiments, the sentinel device is further configured to determine whether one of the wireless devices is a memory-constrained wireless device before communicating the spy routine to that wireless device.

In other particular embodiments, the memory-constrained wireless device is further configured to execute a main application during normal operation, where the main application includes multiple modules. The memory-constrained wireless node is also configured to replace at least one of the multiple modules with the spy routine. The at least one module may not be required for steady-state operation of the memory-constrained wireless device, and the at least one module could be replaced without taking the memory-constrained wireless device offline. The memory-constrained wireless node could also be configured to receive the at least one module from an external source and replace the spy routine with the at least one received module to return the memory-constrained wireless device to normal operation without taking the memory-constrained wireless device offline.

In yet other particular embodiments, the sentinel device is configured to communicate the spy routine to a first subset of the wireless devices. Also, the spy routine resides on a second subset of the wireless devices, and the sentinel device is configured to activate the spy routine in the second subset of the wireless devices.

In still other particular embodiments, the sentinel device is configured to receive a notification associated with the one or more anomalies from a first of the wireless devices, and the sentinel device is configured to communicate the spy routine to a second of the wireless devices. The second wireless device may be located closer to the transmitter than the first wireless device.

In additional particular embodiments, the plurality of wireless devices include one or more wireless repeater or relay nodes in a wireless network and/or one or more wireless field devices configured to communicate with the wireless network.

In a second embodiment, a method includes receiving a data packet from a transmitter at a wireless device. The method also includes detecting one or more anomalies associated with the data packet and communicating a notification in response to detecting the one or more anomalies. The method further includes receiving a spy routine at the wireless device and executing the spy routine to facilitate a determination of whether the transmitter is an intruder and/or isolation of the transmitter.

In a third embodiment, an apparatus includes a wireless interface configured to receive a data packet from a transmitter. The apparatus also includes at least one processor configured to detect one or more anomalies associated with the data packet and initiate communication of a notification in response to detecting the one or more anomalies. The at least one processor is also configured to receive a spy routine and execute the spy routine to facilitate a determination of whether the transmitter is an intruder and/or isolation of the transmitter.

In a fourth embodiment, a computer program is embodied on a computer readable medium. The computer program includes computer readable program code for receiving a data packet from a transmitter and for detecting one or more anomalies associated with the data packet. The computer program also includes computer readable program code for communicating a notification in response to detecting the one or more anomalies. The computer program further includes computer readable program code for receiving a spy routine and executing the spy routine to facilitate a determination of whether the transmitter is an intruder and/or isolation of the transmitter.

In a fifth embodiment, a method includes receiving a notification from one of a plurality of wireless devices, where the notification is associated with one or more anomalies detected by the wireless device. The method also includes communicating a spy routine to at least one of the wireless devices. The spy routine facilitates a determination of whether a transmitter in a wireless network is an intruder and/or isolation of the transmitter.

In a sixth embodiment, an apparatus includes an interface configured to receive a notification from one of a plurality of wireless devices, where the notification is associated with one or more anomalies detected by the wireless device. The apparatus also includes at least one processor configured to identify at least one of the wireless devices and to initiate communication of a spy routine to the at least one wireless device. The spy routine facilitates a determination of whether a transmitter in a wireless network is an intruder and/or isolation of the transmitter.

In a seventh embodiment, a computer program is embodied on a computer readable medium. The computer program includes computer readable program code for receiving a notification from one of a plurality of wireless devices, where the notification is associated with one or more anomalies detected by the wireless device. The computer program also includes computer readable program code for communicating a spy routine to at least one of the wireless devices. The spy routine facilitates a determination of whether a transmitter in a wireless network is an intruder and/or isolation of the transmitter.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 7 and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
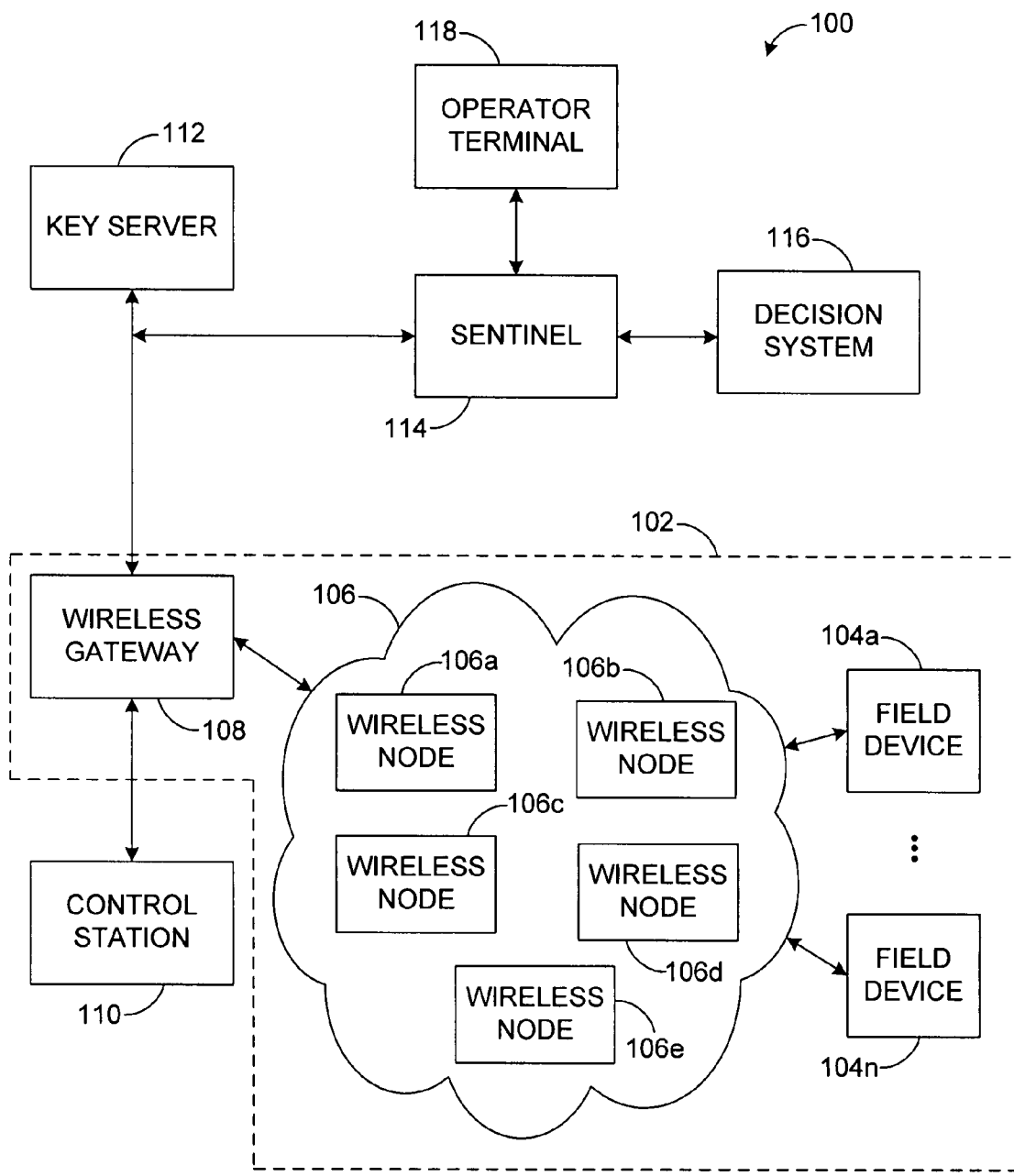
FIG. 1 illustrates an example wireless network intrusion detection system in accordance with this disclosure.

FIG. 1 illustrates an example wireless network intrusion detection system 100 in accordance with this disclosure. The embodiment of the wireless network intrusion detection system 100 shown in FIG. 1 is for illustration only. Other embodiments of the wireless network intrusion detection system 100 could be used without departing from the scope of this disclosure.

As shown in FIG. 1, the system 100 includes a wireless network 102. In this example, the wireless network 102 includes one or more wireless field devices 104a-104n, a repeater system 106, and a wireless gateway 108. The field devices 104a-104n represent wireless devices that can perform a wide variety of functions in the system 100. For example, the field devices 104a-104n could be used for monitoring or controlling various aspects of an industrial process control environment. As particular examples, the field devices 104a-104n could represent sensors (such as temperature sensors or pressure sensors) and actuators used for monitoring and controlling various aspects of the industrial process control environment. The field devices 104a-104n may also operate according to control commands received from the repeater system 106. In some embodiments, the field devices 104a-104n provide process values (such as temperature or pressure values) of various equipment being controlled to the repeater system 106 or accept control values for controlling devices (such as actuators) from the repeater system 106. The field devices 104a-104n may use any suitable wireless technology to communicate, such as frequency-hopping spread-spectrum (FHSS) techniques. Though not shown, the system 100 may also contain wired field devices that are connected by and communicate over wired paths. Each of the field devices 104a-104n may include any suitable hardware, software, firmware, or combination thereof for transmitting and/or receiving data in a wireless network.

The repeater system 106 contains wireless nodes 106a-106e, which represent wireless devices that operate as intermediary nodes (such as repeater or relay nodes) in communication paths to and from the field devices 104a-104n. The communication paths between the gateway 108 and a field device may contain one or more wireless nodes 106a-106e operating as repeater/relay nodes. Each of the wireless nodes 106a-106e may "listen" to data packets being transmitted on a wireless medium to check for data packets intended for that wireless node. A wireless node could represent an end recipient of a data packet (which could be determined based on a destination network address field in the data packet) or a repeater/relay node for the data packet (which could be determined based on the destination Medium Access Control or "MAC" level address field in the data packet). Each of the wireless nodes 106a-106e includes any suitable hardware, software, firmware, or combination thereof for facilitating wireless communications to and/or from the field devices 104a-104n, such as wireless routers or wireless repeaters.

The gateway 108 facilitates communication between the wireless network 102 and external systems or components. For example, the gateway 108 may receive data packets from one or more of the wireless nodes 106a-106e and provide the data packets to external systems or components. The gateway 108 may also receive data packets from the external systems or components and provide the data packets to one or more of the wireless nodes 106a-106e. The gateway 108 could further perform translation functions to translate between different protocols used by the external systems or components and the wireless nodes 106a-106e. The gateway 108 includes any suitable hardware, software, firmware, or combination thereof for facilitating communication between a wireless network and one or more external devices or systems.

In some embodiments, the gateway 108 and the field devices 104a-104n may be viewed as end systems or devices, and the wireless nodes 106a-106e may operate to transport packets between the end systems or devices. In general, the specific node or device to which a data packet is finally destined can be determined by the packet's corresponding network address (such as an Internet Protocol address), and a wireless node 106a-106e may forward the packet to a next node or destination device according to the network address contained in the packet. As described below, a wireless node (implemented as a single physical unit) could operate to assist in intrusion detection while transporting packets in the wireless network 102. A wireless field device could also assist in intrusion detection in the wireless network 102.

In this example, a control station 110 is coupled to the wireless gateway 108. The control station 110 operates to control the operation of the field devices 104a-104n. For example, the control station 110 could transmit control values to output devices (such as actuators) among the field devices 104a-104n via the gateway 108 and one or more of the wireless nodes 106a-106e. The control station 110 may also receive process values from input devices (such as temperature or pressure sensors) among the field devices 104a-104n via one or more of the wireless nodes 106a-106e and the gateway 108. The control station 110 may generate the control values in accordance with any suitable control strategy, and the control values may be based on the received process values.

Also, as noted above, the field devices 104a-104n may use any suitable wireless technology to communicate, such as FHSS techniques. In these embodiments, the control station 110 may allocate various parameters to the field devices 104a-104n to facilitate use of FHSS or other wireless communication techniques. As particular examples, the control station 110 may allocate time slots and network addresses for each of the field devices 104a-104n. In addition, the control station 110 may be connected to various other components (such as a database server, management server, or operator terminals) to facilitate the generation and operation of control strategies. The control station 110 includes any suitable hardware, software, firmware, or combination thereof for controlling the field devices 104a-104n, such as a desktop computer, laptop computer, or other computing device.

During communications from the control station 110, the wireless gateway 108 may receive commands or other data from the control station 110 and transmit the commands or other data over a wireless medium to the appropriate field devices 104a-104n (via the repeater system 106). Similarly, the gateway 108 may receive process values from various field devices 104a-104n over the wireless medium (via the repeater system 106) and provide the values to the control station 110. The field devices 104a-104n, repeater system 106, and gateway 108 may communicate using any suitable wireless signals, such as radio frequency (RF) signals. The field devices 104a-104n, repeater system 106, and gateway 108 may also communicate using any suitable wireless protocol or protocols, such as FHSS, 802.11, or other wireless protocol(s).

A key server 112 generates keys used to encrypt and decrypt data transferred in the system 100, such as data transferred between the control station 110 and the wireless network 102 or data transferred between the wireless nodes 106a-106e and the field devices 104a-104n. The key server 112 also forwards the keys to the wireless gateway 108, which in turn forwards the appropriate keys to the appropriate devices (such as the wireless nodes 106a-106e and the field devices 104a-104n). The key server 112 further provides key information to a sentinel 114 (described below) for use in detecting intrusions into the wireless network 102. The key server 112 includes any suitable hardware, software, firmware, or combination thereof for providing encryption keys to components of the system 100. The key server 112 could also support the use of any suitable encryption mechanism in the system 100, such as a symmetric or asymmetric key encryption approach.

The sentinel 114 (also called a sentinel device) may receive notifications, such as message packets or other signals, from the wireless nodes 106a-106e or field devices 104a-104n via the gateway 108. The notifications can be communicated to the sentinel 114 by the wireless nodes 106a-106e or field devices 104a-104n upon detection of possibly anomalous behavior in the wireless network 102. The possibly anomalous behavior in the wireless network 102 could be indicative of an intrusion into the wireless network 102 by an unauthorized device. Alone or in conjunction with a decision system 116, the sentinel 114 may process the notifications to determine if intrusion into the wireless network 102 is indicated. If so, the sentinel 114 can activate a spy routine in the appropriate wireless node(s) 106a-106e and/or field device(s) 104a-104n to more specifically identify or combat the intrusion. As described below, the sentinel 114 could also download the spy routine to the appropriate wireless node(s) 106a-106e and/or field device(s) 104a-104n before activating the spy routine (or before auto-activation of the spy routine). The manner in which intrusion in the wireless network 102 may be detected and the operation of the spy routine are described below. The sentinel 114 includes any suitable hardware, software, firmware, or combination thereof for detecting intrusion in a wireless network.

The decision system 116 can be used to determine more definitively whether an intrusion into the wireless network 102 may be occurring. The decision system 116 may use any suitable technique to detect possible intrusions. For example, the decision system 116 could use a set of decision rules (such as by using a SNORT decision engine available at Snort Store, c/o Artesian City Marketing, Prattville, Ala.) that specify the manner in which intrusion is to be determined. The decision system 116 could also use probabilistic techniques to identify probable intrusions into the wireless network 102. Any other or additional technique(s) could be used to detect possible intrusion into a wireless network. The decision system 116 includes any suitable hardware, software, firmware, or combination thereof for detecting possible intrusions into a wireless network. While shown as separate from the sentinel 114, the functionality of the decision system 116 could be implemented within or incorporated into the sentinel 114.

One or more operator terminals 118 are coupled to the sentinel 114 and/or other components of the system 100. The operator terminals 118 allow data to be provided to and received from one or more operators. For example, the operator terminals 118 may provide a suitable user interface (such as a display) on which the sentinel 114 may issue an alarm if intrusion into the wireless network 102 is suspected or detected. An operator may then manually issue investigation commands (instead of or in addition to the automated intrusion detection process) via the operator terminal 118 (such as by using a keyboard) to further determine the nature of the intrusion and to initiate action to remove the intruder from the operating zone of the network 102. It should be noted, however, that at least some of the intrusions can be determined and combated without any operator intervention. Each of the operator terminals 118 includes any suitable structure facilitating operator interaction with the system 100, such as a desktop computer, laptop computer, or personal digital assistant.

The various components in FIG. 1 could be coupled together via any suitable wired or wireless connections. For example, the control station 110, key server 112, and sentinel 114 could be coupled to the gateway 108 using wired connections, and the decision system 116 and operator terminal 118 could be coupled to the sentinel 114 using wired connections. As another example, the wireless nodes 106a-106e could communicate with each other, the field devices 104a-104n, and the gateway 108 using wireless connections. Any suitable wired and wireless connections can be used in the system 100. As a particular example, the wired connections could represent Ethernet connections or other electrical data connections.

In one aspect of operation, a wireless node 106a-106e or field device 104a-104n may examine a received data packet for the presence of one or more anomalies. The data packets examined may contain the address of the wireless node 106a-106e or field device 104a-104n in a destination address field. The wireless node 106a-106e or field device 104a-104n may transmit a message packet or other notification to the sentinel 114 upon determining the presence of one or more anomalies. The sentinel 114 may process the notification to determine whether a transmitter of the data packet represents a possible intruder into the wireless network 102. If so, the sentinel 114 activates a spy routine in one or more of the wireless nodes 106a-106e and/or field devices 104a-104n. The spy routine may engage the transmitter of the data packet in further conversation to continue the investigation as to whether the transmitter is indeed an intruder. Since the wireless nodes 106a-106e and/or field devices 104a-104n may operate normally until an anomalous condition or event occurs, the additional power consumption required for detection of an intrusion may be reduced. This may be desirable for use with power-constrained devices, such as battery-operated wireless nodes 106a-106e or field devices 104a-104n.

In another aspect of operation, the sentinel 114 may cause a spy routine to be downloaded to a wireless node 106a-106e or field device 104a-104n before activating the spy routine in the wireless node 106a-106e or field device 104a-104n. Because of this, the wireless node 106a-106e or field device 104a-104n is not required to store the spy routine at all times. For example, this may allow the wireless node 106a-106e or field device 104a-104n to store, during a large portion of its operations, only the applications required for normal operation of the wireless node 106a-106e or field device 104a-104n. The spy routine can be downloaded to the wireless node 106a-106e or field device 104a-104n and activated only when needed (such as only after a possible intrusion has been detected). Once execution of the spy routine is complete, the spy routine can be overwritten in the wireless node 106a-106e or field device 104a-104n, such as by downloading one or more of the applications to the wireless node 106a-106e or field device 104a-104n to again permit normal operation of the wireless node 106a-106e or field device 104a-104n. In this way, memory for permanently storing the spy routine is not required in the wireless node 106a-106e or field device 104a-104n. This may be desirable for use with memory-constrained devices, such as wireless nodes 106a-106e or field devices 104a-104n having a small amount of memory.

In yet another aspect of operation, the wireless nodes 106a-106e may transport packets to end devices (such as the field devices 104a-104n or the gateway 108) in addition to examining the transported packets for anomalies. Due to the implementation of both features in a single device, the number of components in the wireless network 102 can potentially be reduced. Similarly, the field devices 104a-104n may perform other functions (such as transmitting sensor or pressure data and receiving control data) in addition to examining the packets for anomalies. The coverage in the wireless network 102 for intrusion detection may therefore be enhanced due to such features.

Although FIG. 1 illustrates one example of a wireless network intrusion detection system 100, various changes may be made to FIG. 1. For example, the functional division shown in FIG. 1 is for illustration only. Various components in FIG. 1 can be combined or omitted and additional components can be added according to particular needs. As a particular example, the key server 112, sentinel 114, and decision system 116 may be implemented as part of the control station 110. Also, the system 100 could be implemented as part of any suitable system that uses a wireless network. As a particular example, the system 100 of FIG. 1 could be used as or in an industrial process control system and is shown containing only representative elements or systems for illustration. Real-world environments or systems may contain additional systems or components as will be apparent to one skilled in the art. In addition, FIG. 1 illustrates one operational environment in which wireless network intrusion detection can be used. The wireless network intrusion detection functionality could be used in any other suitable system and with any suitable wireless network environment.

Figure 2:
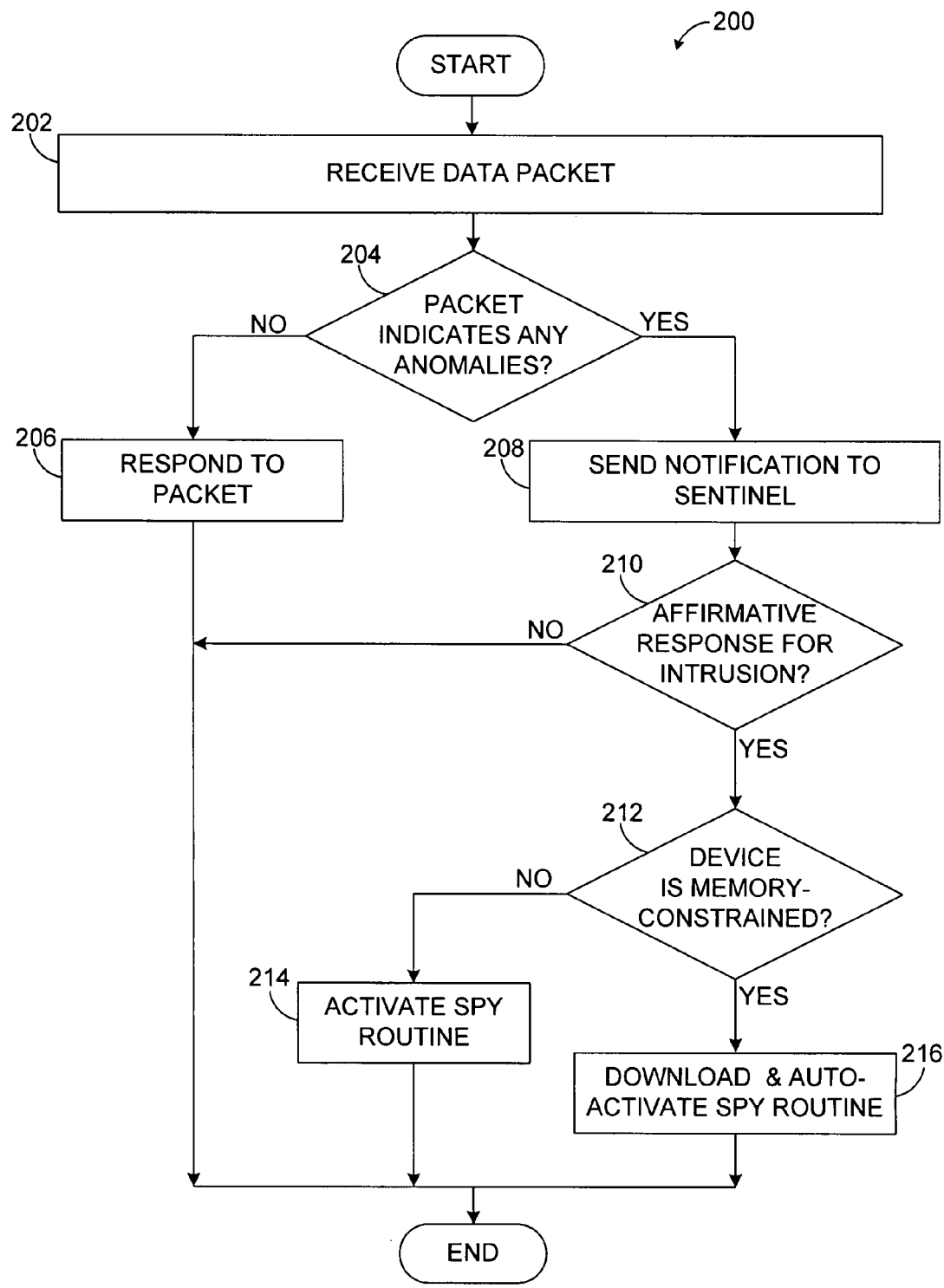
FIG. 2 illustrates an example method for intrusion detection in accordance with this disclosure.

FIG. 2 illustrates an example method 200 for intrusion detection in accordance with this disclosure. The embodiment of the method 200 shown in FIG. 2 is for illustration only. Other embodiments of the method 200 could be used without departing from the scope of this disclosure. Also, for ease of explanation, the method 200 is described with respect to the wireless node 106a in the repeater system 106 of FIG. 1. The method 200 could be used by any suitable device and in any suitable system or environment, such as a wireless field device.

A wireless device receives a data packet at step 202. This may include, for example, the wireless node 106a receiving a data packet from a field device 104a-104n, a gateway 108, or an intruder into the wireless network 102. The destination address field in the data packet may indicate that the data packet is directed to the wireless node 106a, meaning the final intended recipient of the data packet is the wireless node 106a. The destination address field in the data packet may also indicate that the data packet is directed to another device, meaning the final intended recipient of the data packet is not the wireless node 106a (and the wireless node 106a may forward the data packet). In some embodiments, the wireless node 106a may analyze only data packets intended for the wireless node 106a. In other embodiments, the wireless node 106a may also analyze data packets intended for other devices.

Due to the broadcast nature of the wireless medium, multiple data packets may be received at an antenna of a wireless device. Whether particular data packets are directed to a specific wireless device may depend on values in the destination address field of the data packets. A wireless device could also be assigned different addresses at different protocol layers (such as a MAC-layer address, a network-layer address, and an object identifier). Thus, when a data packet contains the address of the wireless device in the destination address field (according to the convention at the corresponding protocol layer), the data packet can be deemed to be directed to the wireless device. Though unicast data packets (packets with an address indicating a single device) could be commonly received, multicast or broadcast addresses can also be used to direct a data packet to the wireless device and to other devices.

The wireless device checks the data packet for one or more anomalies at step 204. An "anomaly" generally refers to a deviation from a normal expected behavior and/or any other deviation(s) that could indicate intrusion into a wireless network. Data packets may be checked for specific anomalies, which can lead to a conclusion that an intrusion may be occurring. In some embodiments, the wireless device can check for MAC-layer level anomalies, network-layer level anomalies, and security-layer level anomalies (although other or additional types of anomalies can be detected).

If the wireless device does not detect one or more anomalies, the wireless device responds to the data packet at step 206. This could include, for example, the wireless node 106a responding to the data packet as if the data packet was a normal (non-intrusion) data packet. As particular examples, the wireless node 106a could forward the data packet to a next device in the transmission path (such as another wireless node, a field device, a gateway, or other device). The wireless node 106a could also transmit an acknowledgement to the transmitter that provided the data packet to the wireless node 106a.

If the wireless device detects one or more anomalies at step 204, the wireless device sends a notification to a sentinel at step 208. In some embodiments, the notification represents a message packet containing or identifying the nature of the anomalous condition(s) or event(s) detected by the wireless node 106a. The message packet may also contain or identify the time of receipt of the data packet, an address of the device that transmitted the data packet, and the received data packet itself. In other embodiments, the message packet may contain or identify only the received data packet associated with the anomalous condition(s) or event(s). In general, the information required for further processing by the sentinel 114 may be sent by the wireless node 106a in the message packet.

Figure 4:
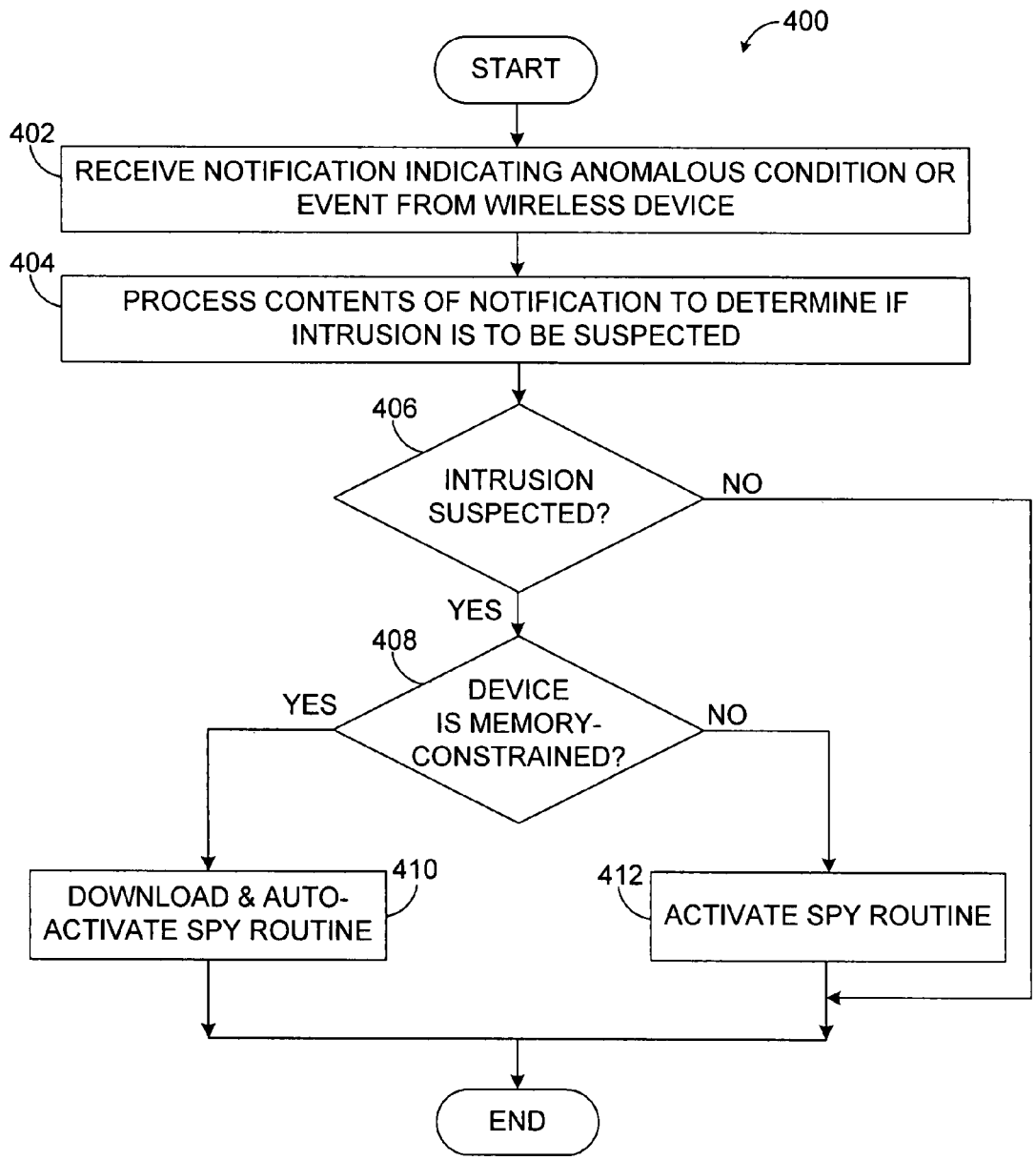
FIG. 4 illustrates an example method for enabling intrusion detection in a wireless network in accordance with this disclosure.

The wireless device determines whether an affirmative response indicating intrusion is received at step 210. For example, a response packet could be received from the sentinel 114 in response to the message packet sent at step 208. In some embodiments, a response packet could be received by the wireless node 106a only when the sentinel 114 determines that a potential intruder has been detected. However, in other embodiments, a response packet could be received even when no intrusion is detected by the sentinel 114, and the response packet could indicate whether or not the transmitter of the data packet is a potential intruder. In these other embodiments, step 210 could involve the wireless device examining the contents of a received response packet to determine if an intrusion is suspected or detected. The response packet can be generated by the sentinel 114 as shown in FIG. 4, which is described below.

If an affirmative response is not received, an affirmative response is not received within a specified interval, or a response does not indicate that the transmitter of the data packet is potentially an intruder, the method 200 may end. The wireless device need not take any further action at this point to further investigate or combat an intrusion. Depending on the implementation, the wireless device may or may not respond to the anomalous data packet.

If an affirmative response is received or a response indicates that the transmitter of the data packet is potentially an intruder, the wireless device may take steps to further investigate or combat the potential intrusion. For instance, if the wireless device is not memory-constrained at step 212, the wireless device activates a spy routine at step 214. This could include, for example, the wireless node 106a initiating execution of a spy routine that enables further investigation into the possible intrusion (and thus enables a determination of intrusion with a greater level of probability). A wireless device that is not memory-constrained could represent a device that contains adequate memory for storing the spy routine over a lengthy period of time, such as during extended periods of normal operation of the wireless device. The determination as to whether a wireless device is memory-constrained could be based on any suitable information, such as information provided by an operator or information collected by the sentinel 114 from the wireless device.

If the wireless device is memory-constrained at step 212, the wireless device downloads and then auto-activates the spy routine at step 216. This could include, for example, the wireless node 106a receiving the spy routine from the sentinel 114. This may also include the wireless node 106a overwriting one or more other applications in its memory with the spy routine. A wireless device that is memory-constrained could represent a device that does not contain adequate memory for storing the spy routine over a lengthy period of time. The spy routine can be downloaded dynamically to the wireless device in any suitable manner, such as over a wired or wireless connection between the wireless device and the sentinel 114 or other device. Also, the spy routine can be downloaded to and executed in the wireless device without the wireless device going offline (such as when the device continues steady-state operation).

The wireless device could perform a variety of operations upon activation of the spy routine. For example, in some embodiments, the wireless device could transmit a "challenge question" to a potential intruder and determine whether an appropriate response is received from the potential intruder. The challenge question could be stored in the wireless device in advance (prior to the detected intrusion). In other embodiments, the wireless device may transmit an encrypted bit stream to a potential intruder and request the bit stream to be returned in decrypted form. Non-receipt of a correct (expected) response from a potential intruder may further strengthen the earlier determination of intrusion. The above-noted investigative techniques by the spy routine are provided merely as examples and are not exhaustive. Any appropriate query and expected response pattern or other investigative technique may be employed to determine intrusion with greater certainty.

Although FIG. 2 illustrates one example of a method 200 for intrusion detection, various changes may be made to FIG. 2. For example, while shown as a series of steps, various steps in FIG. 2 could overlap, occur in parallel, or occur multiple times. As particular examples, in some embodiments, the method 200 shown in FIG. 2 could be performed for each data packet received by the wireless device. In other embodiments, the method 200 shown in FIG. 2 could be performed for each of a subset of the data packets received by the wireless device. Also, although an anomalous condition has been described as being detected based upon a single data packet, an anomalous condition could be determined based on multiple packets, such as multiple packets received in sequence from the same transmitter (a transmitting external wireless device). Further, although the wireless device has been described as both detecting an anomaly and activating the spy routine, the sentinel 114 may send the response to and activate the spy routine in any of the wireless nodes 106a-106e or field devices 104a-104n, allowing the spy routine to be activated in the appropriate wireless node(s) and/or field device(s). Beyond that, the operation of multiple wireless devices could be consistent with the operation of the sentinel 114 to enable effective intrusion detection and isolation. In addition, FIG. 2 has shown that the spy routine is downloaded only when the wireless devices is memory-constrained. In other embodiments, the spy routine could be downloaded to the wireless device regardless of whether the wireless device is memory-constrained.

Figure 3:
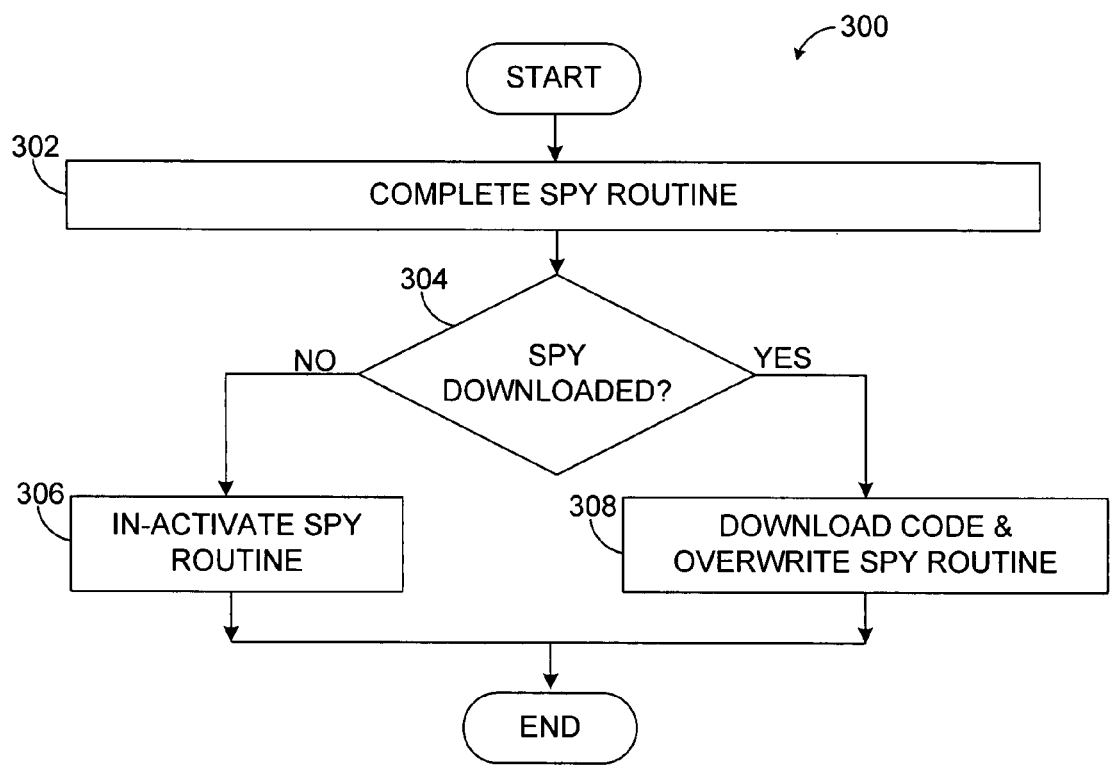
FIG. 3 illustrates an example method for completing execution of a spy routine in a wireless device in accordance with this disclosure.

FIG. 3 illustrates an example method 300 for completing execution of a spy routine in a wireless device in accordance with this disclosure. The embodiment of the method 300 shown in FIG. 3 is for illustration only. Other embodiments of the method 300 could be used without departing from the scope of this disclosure. Also, for ease of explanation, the method 300 is described with respect to the wireless node 106*a* in the repeater system 106 of FIG. 1. The method 300 could be used by any suitable device and in any suitable system or environment, such as a wireless field device.

The wireless device completes execution of the spy routine at step 302. This could include, for example, the wireless node 106*a* transmitting the appropriate query to a possible intruder. This may or may not also include receiving a response from the possible intruder. If received, this may further include the wireless node 106*a* determining if the received response matches an expected response. The results generated by the spy routine can be provided to the sentinel 114, which (by itself or with the decision system 116) could make the final determination as to whether the possible intruder is indeed an intruder.

The wireless device determines whether the spy routine was downloaded at step 304. If not, the spy routine is inactivated at step 306. This may include, for example, the wireless node 106*a* ceasing execution of the spy routine and returning to normal operation. In this case, the wireless device may represent a non-memory-constrained device that can perform its normal operation while allowing the spy routine to remain in the wireless device's memory.

If the spy routine was downloaded, other code is downloaded and the spy routine is overwritten at step 308. This may include, for example, the wireless node 106*a* revoking the spy routine in its memory, meaning the wireless node 106*a* no longer views the memory locations in which the spy routine is stored as containing valid data. This may also include the wireless node 106*a* downloading one or more applications (or components thereof) from a suitable source, such as the control station 110 or the sentinel 114. The one or more downloaded applications could represent the applications that were overwritten in the wireless device's memory when the spy routine was downloaded. The wireless node 106*a* may then execute the downloaded applications and return to normal operation.

In this way, the spy routine can be executed on various devices in the system 100, including memory-constrained wireless devices that might otherwise not be able to execute the spy routine. As a result, the ability to detect and isolate intrusion into the wireless network 102 can be expanded to include memory-constrained wireless devices.

Although FIG. 3 illustrates one example of a method 300 for completing execution of a spy routine in a wireless device, various changes may be made to FIG. 3. For example, while shown as a series of steps, various steps in FIG. 3 could overlap, occur in parallel, or occur multiple times. Also, FIG. 3 has shown that the spy routine is revoked and overwritten only when the wireless device is memory-constrained. In other embodiments, the spy routine could be revoked and possibly overwritten in the wireless device regardless of whether the wireless device is memory-constrained.

FIG. 4 illustrates an example method 400 for enabling intrusion detection in a wireless network in accordance with this disclosure. The embodiment of the method 400 shown in FIG. 4 is for illustration only. Other embodiments of the method 400 could be used without departing from the scope of this disclosure. Also, for ease of explanation, the method 400 is described with respect to the sentinel 114 in the system 100 of FIG. 1. The method 400 could be used by any suitable device in any suitable system or environment.

A sentinel receives one or more notifications indicating one or more anomalous conditions or events at step 402. This could include, for example, the sentinel 114 receiving one or more message packets from at least one of the wireless nodes 106*a*-106*e* and/or field devices 104*a*-104*n*. The one or more anomalies may be detected based on one or more data packets received by the corresponding wireless node(s) or field device(s). The one or more anomalies may correspond to MAC-layer level anomalies, network-layer level anomalies, and security-layer level anomalies. Each message packet may contain or identify the nature of an anomaly, the time of receipt of one or more data packets by a wireless node or field device, an address of the device that transmitted the data packet(s), and the received data packet(s). Each message packet could also contain only a copy of the received data packet(s).

The sentinel processes the contents of the one or more notifications to determine if intrusion is to be suspected at step 404. In some embodiments, the sentinel 114 may maintain a record of occurrences of potential anomalous conditions or events from all wireless nodes 106*a*-106*e* and/or field devices 104*a*-104*n* and may determine intrusion based on statistical techniques. The sentinel 114 may also determine intrusion based on a set of decision rules (such as using a SNORT decision engine) that specify the manner in which intrusion is to be determined. The sentinel 114 may further forward the message packet(s) to the decision system 116, which may perform the processing to determine intrusion based on probabilistic, rule-based, or other techniques.

If intrusion is not suspected at step 406, the method 400 may end. At this point, the sentinel 114 may not need to perform any other actions. The sentinel 114 could also inform one or more of the wireless nodes 106*a*-106*e* and/or field devices 104*a*-104*n* that no intrusion is suspected (such as in the body of a response packet). As a particular example, it is possible that an anomaly could be due to a maintenance issue. In this case, the sentinel 114 may take no further actions, and the method 400 ends. During maintenance, a wireless device may be temporarily unavailable for normal operation and hence its address would not normally be received by other operational devices. If the wireless device undergoing maintenance inadvertently transmits a packet, this may be noted as an anomaly by another wireless device but determined not to be a potential intruder at the sentinel 114.

If intrusion is suspected at step 406, the sentinel determines if a wireless device that will execute the spy routine is memory-constrained at step 408. This may include, for example, the sentinel 114 using data provided by an operator, the wireless device, or other source to determine if a particular wireless device is memory-constrained.

If the wireless device that will execute the spy routine is memory-constrained, the sentinel downloads the spy routine to the wireless device at step 410. This may include, for example, the sentinel 114 providing the spy routine to one or more of the wireless nodes 106*a*-106*e* and/or field devices 104*a*-104*n* over wired or wireless connections. The wireless device may then auto-execute the spy routine. Otherwise, the sentinel activates the spy routine in the wireless device at step

412. This could include, for example, the sentinel sending one or more response packets to the wireless device at step 412. The response packet may thus be seen as a request for further investigation (RFI) and may be provided through a secure channel (such as by encrypting the contents of the response packet using symmetric, asymmetric, or other keys provided by the key server 112) to the corresponding wireless device. In these steps, the sentinel 114 can also provide the network address of the suspected intruder to the wireless device. In some embodiments, the sentinel 114 may further provide an "intrusion" alert to an operator (such as via the operator terminal 118) along with a zone or other location information of the suspected intruder (which could be based on the transmission route information contained in the message packet as described below).

In particular embodiments, the spy routine is activated in (and possibly downloaded to) the wireless device closest to a suspected intruder. The sentinel 114 may identify this wireless device in any suitable manner. For example, the sentinel 114 may determine, from the one or more message packets, the transmission route from a suspected intruder (the transmitter of the one or more data packets containing one or more anomalies). The sentinel 114 may also identify a wireless device (such as one of the wireless nodes 106a-106e) nearest to the suspected intruder. The approximate or relative locations of the wireless nodes 106a-106e and/or field devices 104a-104n may be provided to the sentinel 114 in advance (such as by the control station 110, by an operator at an operator terminal 118, or by some other configuration data).

Although FIG. 4 illustrates one example of a method 400 for enabling intrusion detection in a wireless network, various changes may be made to FIG. 4. For example, while shown as a series of steps, various steps in FIG. 4 could overlap, occur in parallel, or occur multiple times. Also, an anomalous condition could be determined based on one or multiple packets. Further, the operation of the sentinel 114 could be consistent with the operation of multiple wireless devices to enable effective intrusion detection and isolation. In addition, FIG. 4 has shown that the spy routine is downloaded only when a wireless device is memory-constrained. In other embodiments, the spy routine could be downloaded to the wireless device regardless of whether the wireless device is memory-constrained.

From the above description, it may be appreciated that a wireless node 106a-106e or field device 104a-104n can indicate an anomalous condition or event based on one or more packets directed to the wireless node or field device. The sentinel 114 may determine that a transmitter of such packets is a potential intruder based on reports of one or more potentially anomalous conditions or events, possibly from one or multiple ones of the wireless nodes 106a-106e or field device 104a-104n. The sentinel 114 may then cause the spy routine on one or more of the wireless nodes 106a-106e or field device 104a-104n to engage the potential intruder in further communication to confirm that the potential intruder indeed needs to be treated as an intruder. It may be appreciated that the probability of a transmitter being an intruder is enhanced gradually as the processing progresses from wireless device to sentinel to spy routine.

It may also be noted that various steps shown in FIGS. 2 through 4 may operate concurrently. Also, subsequent to steps 410 and 412 in FIG. 4, the sentinel 114 may receive a response for the RFI from the corresponding wireless device (based on a result of step 214 or 216 in FIG. 2). There could be subsequent RFIs and responses to the RFIs. The sentinel 114 may process the responses to the RFIs to determine intrusion with a greater level of certainty. These determinations may also be performed by the decision system 116. The sentinel 114 may also notify or trigger an alert to an operator via an operator terminal 118.

It may further be appreciated from FIGS. 2 through 4 that a wireless device can operate normally (execute normal operations) until an anomalous condition or event occurs. Thus, less power may be used monitoring for an intrusion. Such an approach may be desirable in environments where power consumption constraints can be present. For example, the wireless nodes 106a-106e and/or field devices 104a-104n may be battery-operated devices that operate as part of an industrial process control system. Consequently, it is desirable that the wireless nodes 106a-106e and/or field devices 104a-104n consume a minimal amount of power. In addition, downloading the spy routine to at least the memory-constrained devices may help facilitate the use of the spy routine in the wireless network 102. Such an approach may be desirable in environments where memory constraints can be present.

Figure 5A:
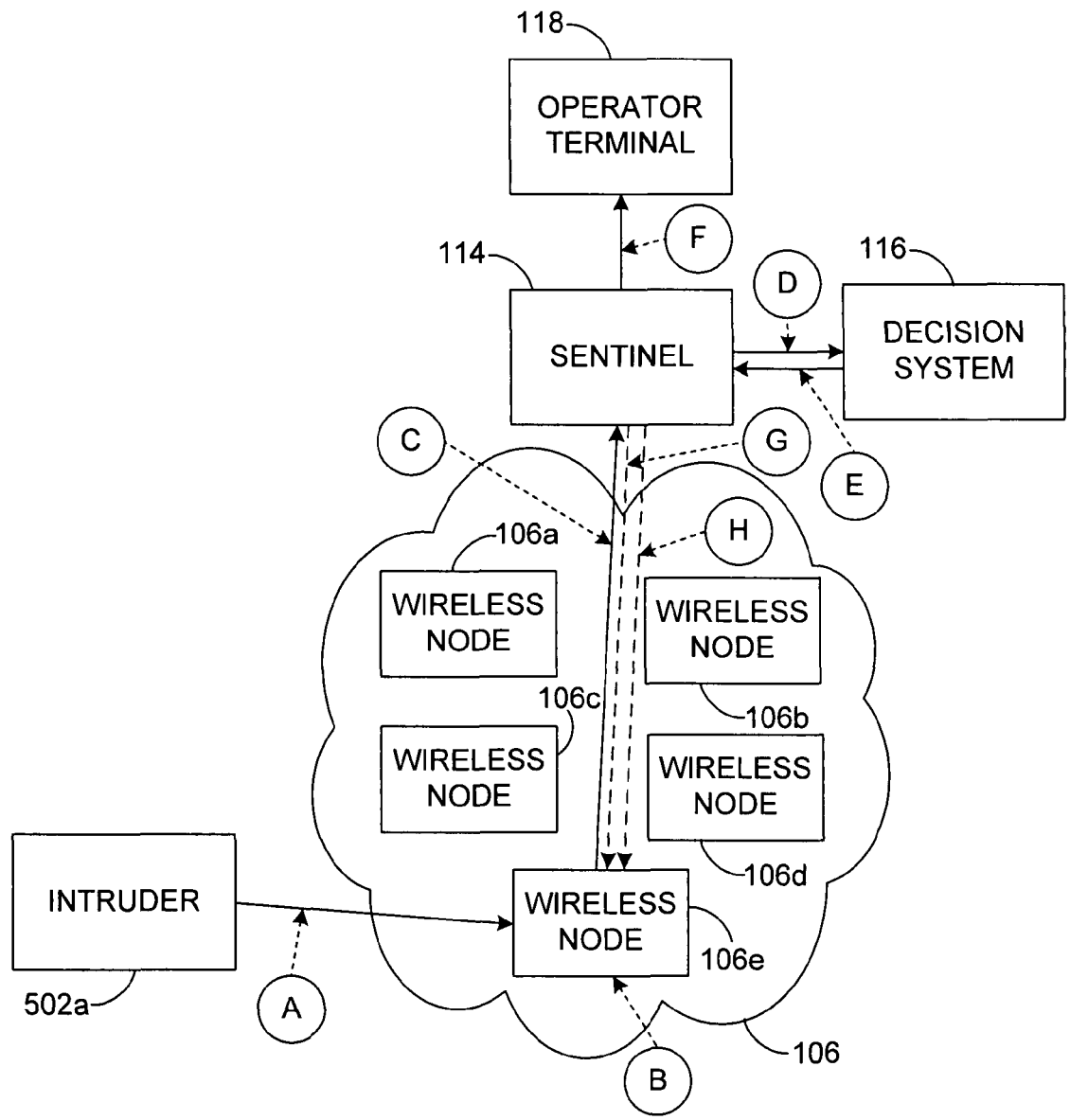
FIGS. 5A and 5B illustrate example intrusion scenarios in accordance with this disclosure.
Figure 5B:
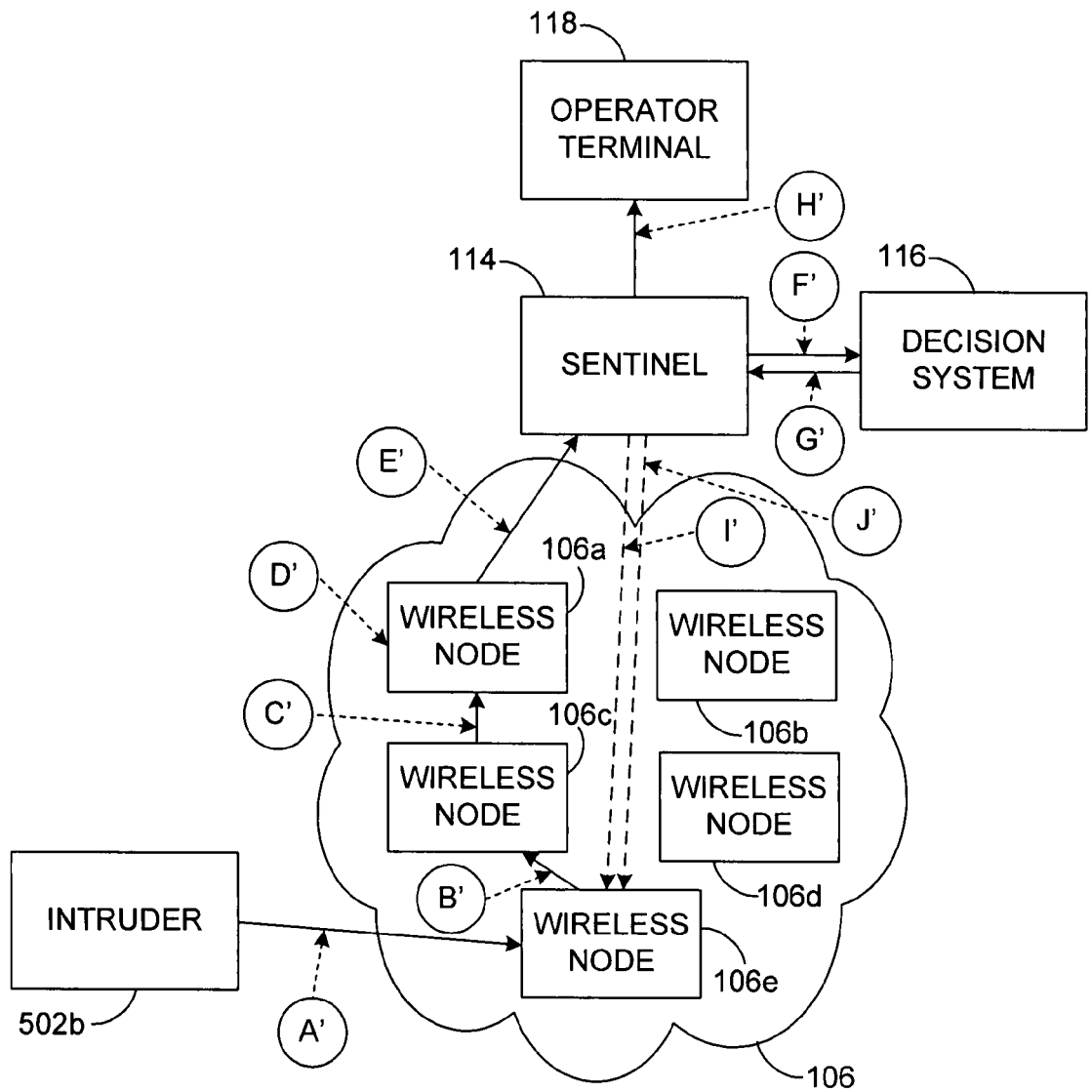

FIGS. 5A and 5B illustrate example intrusion scenarios in accordance with this disclosure. In particular, FIGS. 5A and 5B illustrate example intrusion scenarios and the operation of the methods 200 and 400 described above. These intrusion scenarios are for illustration and explanation only. Other intrusion scenarios could occur in the system 100 of FIG. 1 or in any other suitable system without departing from the scope of this disclosure.

As noted above, a wireless device (such as wireless node 106a) may perform various processing steps to identify one or more possible anomalous conditions or events. For example, a wireless device may first check the destination MAC address in a received data packet. If the destination MAC address matches the wireless device's own MAC address, the wireless device may check the destination network address in the packet. If both the destination MAC address and the destination network address match the wireless device's own MAC and network addresses, the wireless device may conclude that it is the final recipient (intended recipient) of the data packet. The wireless device may then check the security level parameters (or fields) in the data packet.

If the destination network address in the data packet is different from the wireless device's network address (but the destination MAC address matches the device's MAC address), the wireless device may conclude that the data packet is intended for some other wireless device whose MAC address matches the destination network address. The wireless device may also conclude that the data packet is to be forwarded to that other wireless device. Thus, it may be noted that a wireless device may detect anomalies at the MAC layer, network layer, or security layer levels.

It may also be noted here that a possible intruder may pose either as a "legitimate" wireless node or as a wireless field device according to corresponding wireless technologies. For example, the intruder may "listen" to data being transmitted on the wireless medium to obtain the addresses of wireless nodes and/or wireless field devices located in its vicinity (within its communication range). The intruder may then use that information to send unauthorized packets to the wireless network.

Irrespective of the underlying reasons, some representative anomalies that suggest possible intrusions are provided below.

(a) A packet is not expected from a transmitting device: As noted above, wireless field devices 104a-104n may be allocated time slots, such as by the control station 110. The time slots represent time periods in which the field devices 104a-104n may transmit or receive packets.

Each of the wireless nodes 106a-106e may be provided with information about the specific time slots during which corresponding field devices 104a-104n may transmit or receive packets. Thus, if a wireless node notes that a received data packet was received in a non-scheduled time slot (such as from an intruder posing as a wireless field device), this means there was no time slot allotted for the data packet and may therefore suggest a possible intrusion. This anomaly may represent a MAC-layer level anomaly.

(b) A data packet received at a wireless device does not contain a "valid" destination address of a destination device (such as the address of a device that is to be the final recipient of the data packet): A packet may be received with a MAC-level address of a wireless device. However, the address at higher-level protocols (such as the network layer) may not match the address of that wireless device or any other wireless device. This determination can be based, for example, on a network address of the network 102 to which all of the wireless nodes 106a-106e belong.

(c) A packet size (such as a number of bytes) of a data packet is greater than or less than an expected size: In general, many networks (or corresponding technologies/standards) set maximum and minimum sizes of data packets. If the size of a received packet is not within these limits, an anomaly may be detected. This type of anomaly may represent a network-layer level anomaly.

(d) A received data packet contains a wrong or incorrect Message Integrity Code (MIC): A MIC value is a unique code or number that may be contained in every data packet transmitted on the wireless network 102. A reception of a data packet having an invalid MIC value may therefore represent an anomaly. This type of anomaly may represent a security-layer level anomaly.

(e) Nonce anomalies: Each data packet transmitted on the wireless network 102 may be designed to have a field for a Nonce number, which is generally a number with a time-varying value. If a data packet has a Nonce value less than a present value for the network 102, this may potentially indicate that some "rogue" device (intruder) is trying to retransmit a data packet by "listening" to data traffic in the wireless medium and thus may represent an anomaly. The Nonce value may also be randomly generated. This anomaly may represent a security-layer level anomaly.

(f) Flip-flop of a connection status: An intruder may send packets that have the effect of establishing and breaking (security) connections. This anomaly may represent a security-layer level anomaly.

These anomalies are for illustration only. Any other or additional anomalies, such as anomalies based on the specific environment, may be checked for without departing from the scope of this disclosure. An intrusion detection system (such as the system 100) may be implemented to detect intrusions based on one, some, or all of these types of anomalies and/or other or additional anomalies. Example intrusion scenarios are shown in FIGS. 5A and 5B, which are used to describe the operation of the intrusion detection system 100. In FIGS. 5A and 5B, various components in the system 100 of FIG. 1 may be omitted, and only the components of FIG. 1 necessary for an understanding of the following intrusion scenarios are shown.

In FIG. 5A, a device 502a is assumed to be an intruder. The intruder 502a is shown here as transmitting a data packet (denoted by "A" in FIG. 5A) to the wireless node 106e. The intruder 502a may pose as another wireless node or as a wireless field device.

The wireless node 106e may examine the data packet and determine that the data packet was received in a "wrong" time slot (the data packet was not expected). As a result, the wireless node 106e may determine that an anomalous condition is present (denoted by "B"). One scenario where this may occur involves the intruder 502a posing as a wireless field device and transmitting a data packet to the wireless node 106e in a "wrong" time slot.

In a different scenario, the intruder 502a is posing as another wireless node and transmits a data packet with a destination MAC address that is the same as the MAC address of the wireless node 106e but with an invalid network address (of a destination device) to which the data packet is to be relayed/forwarded by wireless node 106e. In this scenario, the wireless node 106e may note that the destination network address is invalid and hence treat the data packet as representing an anomaly.

Once an anomaly is detected, the wireless node 106e transmits a message packet (denoted by "C") to the sentinel 114. In other embodiments, instead of transmitting a message packet after detection of a single anomalous event, the wireless node 106e may wait for detection of multiple anomalous events and then transmit the message packet.

In this example, the sentinel 114 forwards the message packet to the decision system 116 (denoted by "D"). If an intrusion is detected or suspected by the decision system 116, the decision system 116 sends a notification (denoted by "E") that intrusion is suspected to the sentinel 114. In other embodiments, the sentinel 114 may itself make a determination of intrusion.

If intrusion is suspected, the sentinel 114 sends an alert (denoted by "F") to an operator via the operator terminal 118. The sentinel 114 may optionally send a spy routine (denoted by "G") to the wireless node 106e, such as when the wireless node 106e represents a memory-constrained device. The sentinel 114 may also optionally send a response packet (denoted by "H") to the wireless node 106e. Receipt of the response packet activates the spy routine in the wireless node 106e, and the spy routine enables further investigation into the intrusion. The response packet may be optional since the spy routine could be auto-activated in the wireless node 106e if the spy routine is downloaded to the wireless node 106e.

FIG. 5B illustrates another example intrusion scenario. A device 502b is assumed to be an intruder and is shown transmitting a data packet (denoted by "A'"), which is destined for the wireless node 106a. The data packet has the address of the wireless node 106a in its destination network address field, and the data packet is received by the wireless node 106e.

The wireless node 106e examines the data packet at the MAC-layer and network-layer levels and may determine that no anomalies are detected. The wireless node 106e then timestamps the packet with its own MAC address and network layer address and forwards the data packet to the wireless node 106c (denoted by "B'"). The wireless node 106c similarly examines the data packet at the MAC-layer and network-layer levels and may determine that no anomalies are detected. The wireless node 106c also timestamps the packet with its own MAC address and network address and forwards the data packet to the wireless node 106a (denoted by "C'").

The wireless node 106a may receive the data packet and determine that a security-layer level anomaly is associated with the data packet. For example, the wireless node 106a may note that the data packet has an incorrect MIC value. Determination of this anomaly is denoted by "D'" in FIG. 5B.

The wireless node 106a then transmits a message packet (denoted by "E'") to the sentinel 114. The message packet could contain the type of anomaly (an incorrect MIC value in this example), the time that the packet was received, the network address of the intruder 502b, the data packet itself, and routing information containing the transmission route followed by the data packet in traveling from the intruder 502b to the wireless node 106a. Any suitable format can be used to send this and/or other or additional information. In other embodiments, instead of transmitting a message packet after detection of a single anomalous event (a single instance), the wireless node 106a may wait for detection of multiple anomalous events (multiple instances) and then transmit the message packet.

The sentinel 114 forwards the message packet to the decision system 116 (denoted by "F'"). In response, the sentinel 114 receives an indication (denoted by "G'") that intrusion is suspected. In other embodiments, the sentinel 114 itself may make a determination of intrusion.

Since the data packet received at the sentinel 114 has the routing information (the transmission route and addresses of devices in the transmission route from the intruder 502b to the sentinel 114), the sentinel 114 can determine which wireless node is located nearest to the intruder 502b. Generally, a wireless node that is the first recipient (the first node in the communication route) to receive a data packet is often the wireless node nearest to the transmitter (originator) of the data packet. The physical location (such as the geographical identification or coordinates) of each wireless node may be provided in advance to the sentinel 114, such as by an operator based on an installation/deployment chart via the operator terminal 118. In this example, the sentinel 114 may determine that the intruder 502b is located in a zone close to the wireless node 106e, where the area of the zone is generally determinable based on the sensitivity of the receiver circuitry of the wireless node 106e (which is generally known in advance).

The sentinel 114 sends an alert (denoted by "H'") to an operator that intrusion is suspected, along with the location or zone in which the intruder 502b may be present. The sentinel 114 may optionally send a spy routine (denoted by "I'") to the wireless node 106e, such as when the wireless node 106e represents a memory-constrained device. The sentinel 114 may also optionally send a response packet (denoted by "J'") to the wireless node 106e. The receipt of the response packet activates the spy routine in the wireless node 106e (unless the spy routine is auto-activated in response to the download), and the spy routine enables further investigation into the intrusion.

In some embodiments, the sentinel 114 and the wireless device(s) in which the spy routine is activated operate to further investigate whether intrusion is to be declared. Once intrusion is determined to be present with a probability greater than a threshold level, appropriate corrective action may be initiated to prevent the intruder 502a-502b from affecting the wireless network 102. For example, the wireless device(s) executing the spy routine may block data packets received from the intruder, such as by not forwarding the data packets to a next node or device. This may prevent network flooding and denial of service attacks. As another example, encrypt/decrypt keys generated by the key server 112 may be changed (updated) at shorter time intervals (greater frequency) upon a determination of intrusion. As yet another example, manual/operator intervention may be initiated to remove the intruder from the operating zone of the network 102.

In some embodiments, the spy routine can be activated in a single wireless device when intrusion is suspected. In other embodiments, the spy routine can be activated in multiple wireless devices when intrusion is suspected. When activated in multiple wireless devices, the spy routines in the wireless devices could interact with one another and collaborate in order to identify and isolate an intruder in the wireless network 102.

Although FIGS. 5A and 5B illustrate examples of intrusion scenarios, various changes may be made to FIGS. 5A and 5B. For example, intruders can attempt to infiltrate a wireless network in any other suitable manner. Also, intruders can be detected and isolated or removed in any other suitable manner.

Figure 6:
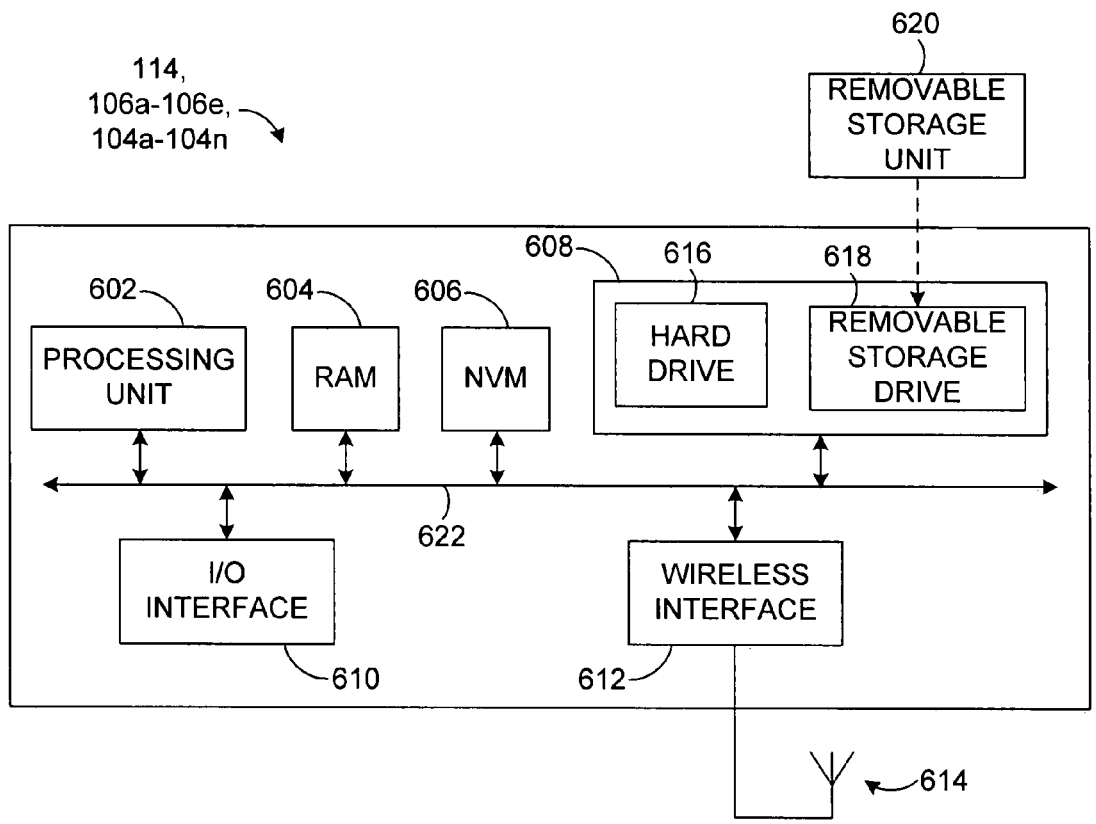
FIG. 6 illustrates an example sentinel or wireless device in a wireless network intrusion detection system in accordance with this disclosure.

FIG. 6 illustrates an example sentinel 114 or wireless device (such as wireless nodes 106a-106e or wireless devices 104a-104n) in a wireless network intrusion detection system in accordance with this disclosure. The embodiment of the sentinel 114 or wireless device shown in FIG. 6 is for illustration only. Other embodiments of the sentinel 114 or wireless device could be used without departing from the scope of this disclosure. Also, the sentinel 114 and the wireless device could have similar or different implementations depending on particular needs. In addition, a common description of both the sentinel 114 and the wireless device is provided for conciseness while noting various differences between these components.

In this example, the sentinel 114 or wireless device includes a processing unit 602, a random access memory (RAM) 604, a non-volatile memory (NVM) 606, a storage 608, an input/output (I/O) interface 610, a wireless interface 612, and an antenna 614. The processing unit 602 performs various operations to implement the desired functionality in the sentinel 114 or wireless device. For example, in the sentinel 114, the processing unit 602 could receive message packets and make determinations about whether an intrusion is suspected (or interact with the decision system 116 and allow the decision system 116 to make that determination). In the wireless node 106a-106e, the processing unit 602 could analyze received data packets and determine if any anomalies are present. In the wireless field devices 104a-104n, the processing unit 602 could operate to provide process data, implement control data, and detect anomalies. The processing unit 602 includes any suitable processing device or devices. For instance, the processing unit 602 may contain one or more processors. This could include general-purpose processors that can execute instructions and/or special-purpose processors adapted for specific tasks. The general-purpose and special-purpose processors may be provided with instructions from the RAM 604. As a particular example, the processing unit 602 may read sequences of instructions from various types of memory (such as the RAM 604, non-volatile memory 606, and storage 608) and execute the instructions to provide various functionality.

The RAM 604 and the non-volatile memory 606 may represent any suitable storage and retrieval devices for storing any suitable information. For example, the RAM 604 may receive instructions and data from the non-volatile memory 606 and provide the instructions to the processing unit 602 for execution. The non-volatile memory 606 may store software instructions and data, which enable the sentinel 114 or the wireless device, as applicable, to provide the desired functionality. The non-volatile memory 606 could be implemented, for example, as a read-only memory (ROM) or flash memory.

The storage 608 may contain various storage and retrieval units or components, such as a hard drive 616 and/or a removable storage drive 618. The removable storage drive 618 may represent a drive capable of receiving a removable storage unit 620, which could represent a portable storage medium. Floppy drives, magnetic tape drives, CD-ROM drives, DVD drives, Flash memory interfaces, and removable memory interfaces (such as PCMCIA or EPROM interfaces) are examples of the removable storage drive 618. Floppy disks, magnetic tapes, CDs, DVDS, Flash memory, and removable memory chips (such as PCMCIA cards or EPROMs) are examples of the removable storage unit 620. The storage 608 may be used to store instructions and data, which enable the sentinel 114 or the wireless device to provide the desired functionality. In a particular implementation of the sentinel 114, some or all of the data and instructions may be provided on the removable storage unit 620, and the data and instructions may be read and provided by the removable storage drive 618 to the processing unit 602 via the RAM 604.

The I/O interface 610 provides an interface to receive data from and send data to external devices or systems, such as over wired paths. The I/O interface 610 can be used, for example, to enable an operator/user to provide inputs and receive outputs (in the case of the sentinel 114), to perform diagnostic tests prior to deployment (in case of the wireless node 106a-106e), or to interact with sensors or actuators (in case of the field devices 104a-104n). As a particular example, the I/O interface 610 may be used to provide an alert to an operator terminal 118 about a possible intrusion. The I/O interface 610 could be implemented in any suitable manner.

The wireless interface 612 enables the sentinel 114 or the wireless device to send and receive data over a wireless medium (via the antenna 614) consistent with a desired communication protocol. The wireless interface 612 could be implemented in any suitable manner. As a particular example, the wireless interface 612 could represent an RF transceiver.

In this example, a bus 622 couples the various components of the sentinel 114 or wireless node 106a-106e. The bus 622 represents any suitable communication bus that can be used to facilitate communication between components.

As noted above, each of the wireless devices and the sentinel 114 can be implemented in hardware, software, firmware, or combination thereof. In general, when throughput performance is of primary consideration, the implementation may be performed more in hardware (such as in the form of an application specific integrated circuit). When cost is of primary consideration, the implementation may be performed more in software (such as by using a processor executing instructions provided in software/firmware). Cost and performance can be balanced with a desired mix of hardware, software, and/or firmware.

Although FIG. 6 illustrates one example of a sentinel 114 or wireless device in a wireless network intrusion detection system, various changes may be made to FIG. 6. For example, the functional division shown in FIG. 6 is for illustration only. Various components in FIG. 6 can be combined or omitted and additional components can be added according to particular needs. As a particular example, particular memories or storages can be omitted if not required. Also, as noted above, the sentinel 114 or wireless device could be implemented using any suitable hardware, software, firmware, or combination thereof. As a result, FIG. 6 illustrates only one of many possible implementations of the sentinel 114 or wireless device.

Figure 7:
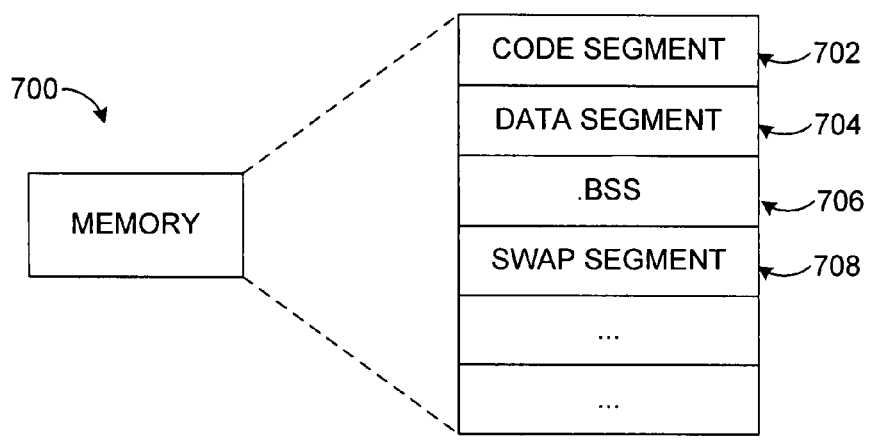
FIG. 7 illustrates an example memory configuration in a wireless device in accordance with this disclosure.

FIG. 7 illustrates an example memory configuration 700 in a wireless device in accordance with this disclosure. The embodiment of the memory configuration 700 shown in FIG. 7 is for illustration only. Other embodiments of the memory configuration 700 could be used without departing from the scope of this disclosure.

As noted above, the sentinel 114 may activate the spy routine in one or more wireless nodes 106a-106e and/or field devices 104a-104n upon detecting a possible intrusion into the wireless network 102. Optionally, the sentinel 114 can download the spy routine to the one or more wireless nodes 106a-106e and/or field devices 104a-104n. This may be useful, for example, when one or more of the wireless nodes 106a-106e and/or field devices 104a-104n represent memory-constrained devices. A memory-constrained device may represent a wireless device that lacks adequate memory (such as in the RAM 604, non-volatile memory 606, or storage 608) for storing the spy routine along with the code required for normal operation of the wireless device.

To allow the spy routine to be used with memory-constrained wireless devices (and possibly other wireless devices), the sentinel 114 may download the spy routine to a wireless device for execution on the wireless device. This could occur, for example, after a potential intrusion has been detected. In some embodiments, the spy routine could be downloaded only to memory-constrained wireless devices, and the spy routine may reside more permanently on non-memory-constrained wireless devices. In other embodiments, the spy routine could be downloaded to each wireless device when the spy routine is needed at that wireless device (without regard to whether the wireless device is memory-constrained). The spy routine may then be executed by the wireless device. When execution of the spy routine is complete, a memory-constrained wireless device may delete or revoke the spy routine, and code required for normal operation of the wireless device can be downloaded to the wireless device. This allows the memory-constrained wireless device to resume normal operation. If the spy routine is downloaded to a non-memory-constrained wireless device, the non-memory-constrained wireless device could allow the spy routine to remain in its memory, or the non-memory-constrained wireless device could delete or revoke the spy routine.

As shown in FIG. 7, the memory arrangement 700 of a wireless device includes various segments 702-704. Each of the segments 702-704 is used for a different purpose, namely to store different types of data. For example, a code segment 702 is used to store the instructions and other programs executed by the wireless node 106a-106e or field device 104a-104n. As a particular example, the code segment 702 could store executable binary task images that can be executed by the processing unit 602 in the wireless device. A data segment 704 stores data used by the programs being executed by the wireless node 106a-106e or field device 104a-104n. As a particular example, the data segment 704 could store data used, collected, or generated by the wireless device during execution of the binary task images, such as initialized variables. A Block Started by Symbol or "BSS" segment 706 stores data used by uninitialized programs in the wireless node 106a-106e or field device 104a-104n. As a particular example, the BSS segment 706 could store uninitialized variables. A swap segment 708 is used as a swap memory, which could support the use of virtual memory in the wireless node 106a-106e or field device 104a-104n. Other segments could also be used in the memory arrangement 700, such as heap and stack segments.

During normal operation, one or more main applications may reside in the memory configuration 700 of the wireless device, such as in the code segment 702. The main applications may represent the software or firmware that helps in the boot-up, steady-state operation, and termination phases of the wireless device. The main application is often subdivided into different layers, such as application layer software, security layer software, network layer software, and MAC/physical (PHY) layer software.

In some embodiments, the one or more main applications are divided into modules (which may also be called features or functions). Some of the modules of the main applications may not be required for steady-state operation of the wireless node 106a-106e or field device 104a-104n. For example, at the security layer, layer initialization functions, session establishment functions, and key update functions (involving key exchanges between the key server 112 and the wireless device) may not be required for steady-state operation of the wireless device. At the MAC and network layers, node discovery functions may not be required for steady-state operation of the wireless device. At the application layer, layer initialization functions may not be required for steady-state operation of the wireless device. These modules are for illustration only and are not exhaustive, and any other or additional modules could be viewed as not being required for steady-state operation of the wireless device. Also, this list of modules can be extended or reduced depending on the importance of the different functions in the wireless device's steady-state operation scenario.

The modules that are not required for steady-state operation of the wireless device can be identified, such as at the pre-compilation stage before the software/firmware for the wireless device is compiled. Using compiler directives or other techniques, these modules can be located at contiguous memory locations in the wireless device, such as in the code segment 702 in the wireless node device.

When execution of the spy routine is needed to confirm or isolate an intruder in the wireless network 102, the spy routine can be downloaded into the wireless device. For example, the spy routine can be downloaded and stored in the swap segment 708 of the memory configuration 700. The spy routine can then be stored in the code segment 702, such as in the contiguous memory locations containing the modules that are not required for steady-state operation of the wireless device. The offset locations in the code segment 702 where the spy routine is stored can be decided at compile time. The code in the code segment 702 may be only partially swapped, meaning only some of the code in the code segment 702 needs to be overwritten. This allows the steady-state operation of the wireless device to continue while the spy routine is being downloaded and stored. The partial swap may be facilitated by tuning the spy routine to make use of a heap and stack for its variable data storage and computation needs (rather than using the data segment 704). Once the spy routine is loaded into the code segment 702, dynamic re-linking of the security functionality in the wireless device occurs, and the spy routine can be executed without taking the wireless device offline.

Once execution of the spy routine is complete, the wireless device can download the modules that were overwritten by the spy routine. The downloaded modules could be initially stored in the swap segment 704 and then loaded into the code segment 702. Dynamic re-linking of the downloaded modules occurs, and the wireless device may resume normal operation without taking the wireless device offline. All of this may occur while the steady-state operation of the wireless device continues. For example, the software/firmware update (the downloading of the spy routine and the downloading of the modules) and the steady-state operation can be handled simultaneously, such as by treating them as time-shared tasks in the wireless device's operating system.

The above description has described the reloading of the modules into the wireless device after completion of the spy routine. However, the reloading of the modules into the wireless device could occur at other times. For example, the modules could be reloaded into the wireless device after the sentinel 114 is informed that the wireless device will be rebooted (and therefore the modules may be needed during the termination and subsequent boot-up phases of the device).

Although FIG. 7 illustrates one example of a memory configuration 700 in a wireless device, various changes may be made to FIG. 7. For example, the wireless device could include any other suitable memory arrangement. Also, the wireless device could use any other suitable technique to load a spy routine and to return to normal operation.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video/versatile disc (DVD), or any other type of memory. Example computer readable mediums can be randomly accessed, volatile, non-volatile, removable, or non-removable. While the computer readable medium may be shown or described as being provided from within a system or device, the computer readable medium can be provided external to system or device, as well.

It may be advantageous to set forth definitions of certain words and phrases used throughout this patent document. The term "packet" refers to any information-bearing communication signal, regardless of the format used for a particular communication signal. The terms "application," "program," and "routine" refer to one or more computer programs, sets of instructions, procedures, functions, objects, classes, instances, or related data adapted for implementation in a suitable computer language. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of the invention, as defined by the following claims.

What is claimed is:

1. A system comprising:
   a plurality of wireless devices configured to receive data packets over a wireless medium, at least one of the wireless devices configured to detect one or more anomalies associated with a received data packet; and
   a sentinel device configured to communicate a spy routine to one or more of the wireless devices in response to the detection of the one or more anomalies;
   wherein the one or more wireless devices are further configured to execute the spy routine to facilitate at least one of: a determination of whether a transmitter of the received data packet is an intruder and isolation of the transmitter.

2. The system of claim 1, wherein the sentinel device is further configured to determine whether one of the wireless devices is a memory-constrained wireless device before communicating the spy routine to that wireless device.

3. The system of claim 2, wherein the memory-constrained wireless device is further configured to:
   execute a main application during normal operation, the main application comprising multiple modules; and
   replace at least one of the multiple modules with the spy routine.

4. The system of claim 3, wherein:
   the at least one module is not required for steady-state operation of the memory-constrained wireless device; and
   the at least one module is replaced without taking the memory-constrained wireless device offline.

5. The system of claim 3, wherein the memory-constrained wireless device is further configured to:
   receive the at least one module from an external source; and
   replace the spy routine with the at least one received module to return the memory-constrained wireless device to normal operation without taking the memory-constrained wireless device offline.

6. The system of claim 1, wherein:
   the sentinel device is configured to communicate the spy routine to a first subset of the wireless devices; and
   the spy routine resides on a second subset of the wireless devices, the sentinel device configured to activate the spy routine in the second subset of the wireless devices.

7. The system of claim 1, wherein:
   the sentinel device is configured to receive a notification associated with the one or more anomalies from a first of the wireless devices; and
   the sentinel device is configured to communicate the spy routine to a second of the wireless devices.

8. The system of claim 7, wherein the second wireless device is located closer to the transmitter than the first wireless device.

9. The system of claim 1, wherein the plurality of wireless devices comprise at least one of:
   one or more wireless repeater or relay nodes in a wireless network; and
   one or more wireless field devices configured to communicate with the wireless network.

10. The system of claim 1, wherein the one or more anomalies comprise at least one of:
    reception of the received data packet in a non-scheduled time slot;
    an absence of a destination address in the received data packet;
    an incorrect packet size of the received data packet;
    an incorrect message integrity code in the received data packet;
    an incorrect nonce value in the received data packet; and
    observation of repeated changes in a connection status.

11. A method comprising:
    receiving a data packet from a transmitter at a wireless device;
    detecting one or more anomalies associated with the data packet;
    communicating a notification in response to detecting the one or more anomalies;
    receiving a spy routine at the wireless device; and
    executing the spy routine to facilitate at least one of: a determination of whether the transmitter is an intruder and isolation of the transmitter.

12. The method of claim 11, wherein the wireless device is a memory-constrained wireless device having an inadequate amount of memory for storing both a main application used during normal operation and the spy routine.

13. The method of claim 12, further comprising:
    executing the main application at the wireless device during normal operation, the main application comprising multiple modules; and
    replacing at least one of the multiple modules with the spy routine.

14. The method of claim 13, wherein:
    the at least one module is not required for steady-state operation of the memory-constrained wireless device; and
    the at least one module is replaced without taking the memory-constrained wireless device offline.

15. The method of claim 13, further comprising:
    receiving the at least one module from an external source; and
    replacing the spy routine with the at least one received module to return the wireless device to normal operation without taking the memory-constrained wireless device offline.

16. An apparatus comprising:
    a wireless interface configured to receive a data packet from a transmitter; and
    at least one processor configured to:
    detect one or more anomalies associated with the data packet;
    initiate communication of a notification in response to detecting the one or more anomalies;
    receive a spy routine; and
    execute the spy routine to facilitate at least one of: a determination of whether the transmitter is an intruder and isolation of the transmitter.

17. The apparatus of claim 16, further comprising:
    at least one memory configured to store a main application used during normal operation and the spy routine.

18. The apparatus of claim 17, wherein the at least one processor is further configured to:
    execute the main application during normal operation, the main application comprising multiple modules; and
    replace at least one of the multiple modules with the spy routine.

19. The apparatus of claim 18, wherein:
    the at least one module is not required for steady-state operation of the apparatus; and
    the at least one module is replaced without taking the apparatus offline.

20. The apparatus of claim 18, wherein the at least one processor is further configured to:
- receive the at least one module from an external source; and
- replace the spy routine with the at least one received module to return the apparatus to normal operation without taking the apparatus offline.

21. A non-transitory computer readable medium encoded with a computer program, the computer program comprising computer readable program code for:
- receiving a data packet from a transmitter;
- detecting one or more anomalies associated with the data packet;
- communicating a notification in response to detecting the one or more anomalies;
- receiving a spy routine; and
- executing the spy routine to facilitate at least one of: a determination of whether the transmitter is an intruder and isolation of the transmitter.

22. A method comprising:
- receiving a notification from one of a plurality of wireless devices, the notification associated with one or more anomalies detected by the wireless device, the one or more anomalies associated with a data packet received by the wireless device; and
- communicating a spy routine to at least one of the wireless devices, the spy routine facilitating at least one of: a determination of whether a transmitter of the data packet is an intruder and isolation of the transmitter.

23. The method of claim 22, further comprising:
- determining that the at least one wireless device is a memory-constrained wireless device having an inadequate amount of memory for storing both a main application used during normal operation and the spy routine.

24. The method of claim 22, wherein:
- receiving the notification comprises receiving the notification from a first of the wireless devices; and
- communicating the spy routine comprises communicating the spy routine to a second of the wireless devices.

25. The method of claim 24, wherein the second wireless device is located closer to the transmitter than the first wireless device.

26. An apparatus comprising:
- an interface configured to receive a notification from one of a plurality of wireless devices, the notification associated with one or more anomalies detected by the wireless device, the one or more anomalies associated with a data packet received by the wireless device; and
- at least one processor configured to identify at least one of the wireless devices and to initiate communication of a spy routine to the at least one wireless device, the spy routine facilitating at least one of: a determination of whether a transmitter of the data packet is an intruder and isolation of the transmitter.

27. The apparatus of claim 26, wherein the at least one processor is further configured to determine that the at least one wireless device is a memory-constrained wireless device having an inadequate amount of memory for storing both a main application used during normal operation and the spy routine.

28. The apparatus of claim 26, wherein the at least one processor is configured to:
- receive the notification from a first of the wireless devices; and
- communicate the spy routine to a second of the wireless devices.

29. The apparatus of claim 28, wherein the second wireless device is located closer to the transmitter than the first wireless device.

30. The apparatus of claim 26, wherein:
- the at least one processor is configured to communicate the spy routine to a first subset of the wireless devices; and
- the spy routine resides on a second subset of the wireless devices, the at least one processor configured to activate the spy routine in the second subset of the wireless devices.

31. A non-transitory computer readable medium encoded with a computer program, the computer program comprising computer readable program code for:
- receiving a notification from one of a plurality of wireless devices, the notification associated with one or more anomalies detected by the wireless device, the one or more anomalies associated with a data packet received by the wireless device; and
- communicating a spy routine to at least one of the wireless devices, the spy routine facilitating at least one of: a determination of whether a transmitter of the data packet is an intruder and isolation of the transmitter.

* * * * *